Jan. 20, 1942.  C. BURTON ET AL  2,270,622
RESILIENT WHEEL
Original Filed July 20, 1939

Inventors:
CARROLL BURTON and
DOUGLAS P. STEWARD.
by: John E. Jackson
their Attorney.

Patented Jan. 20, 1942

2,270,622

UNITED STATES PATENT OFFICE 2,270,622

RESILIENT WHEEL

Carroll Burton and Douglas P. Steward, Johnstown, Pa., assignors to Carnegie-Illinois Steel Corporation, a corporation of New Jersey Original application July 20, 1939, Serial No. 285,629. Divided and this application August 1, 1940, Serial No. 349,178

2 Claims. (Cl. 295—11)

This application is a division of our application Serial No. 285,629, filed July 20, 1939, for Resilient car wheels, and relates primarily to wheels employed with rail borne vehicles and to new and improved methods of resisting radial and torsional movement of the several parts of the wheel assembly with reference to each other, without which means the resilient feature of the wheel could not function efficiently in reducing the noise and the shocks normally transmitted from rail through wheel to axle and truck.

Heretofore, resilient wheels of the prior art have embodied resilient members held between rigid members in some convenient way. Such constructions, however, were not positive in maintaining proper assembly conditions as they depended largely on metal-to-metal friction, or rubber-to-metal, induced by assembly pressure, which latter varied from temperature variations or inaccurate sizing of the component parts of the wheel. It is true that good results could be obtained by very close part tolerances, but such were costly and impracticable to produce commercially.

In addition, the abutting contact in such constructions, of metallic parts with resilient members, produced a condition of easy transfer of braking heat through the metallic parts to the resilient members, with the result that said resilient members deteriorated prematurely from such excessive heat.

One of the objects of our invention is to provide means whereby a uniformly distributed assembly pressure can be applied to the wheel over the area of the resilient members which will not be affected by conditions of climatic temperature variations. Another object is to provide means whereby radial movement of the several wheel parts relative to one another will be positively prevented. An important object is to incorporate means whereby the transfer of excessive braking heat will be eliminated to such an extent that it will not be of a damaging nature.

Figure 1:
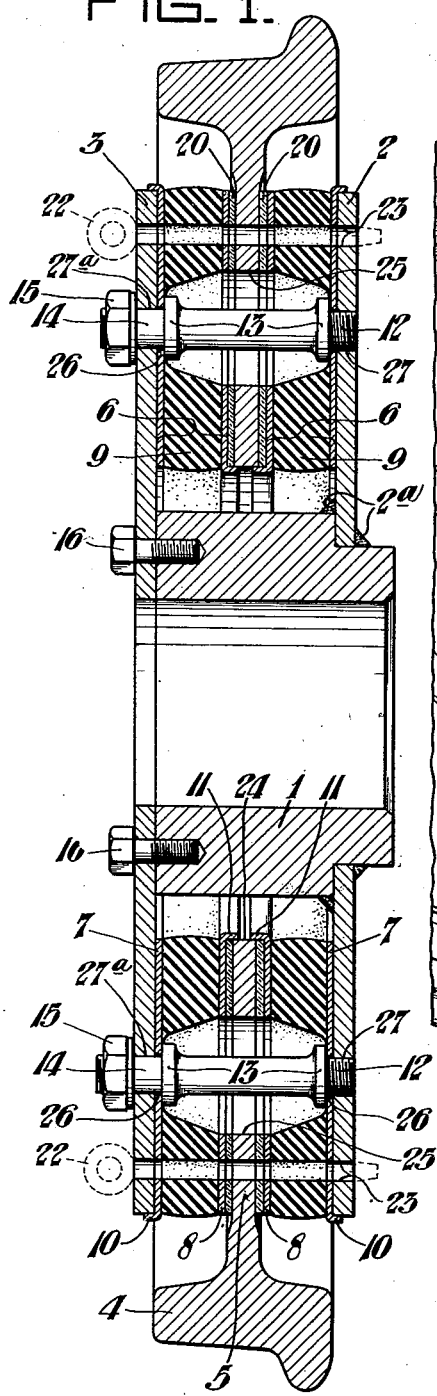
Figure 2:
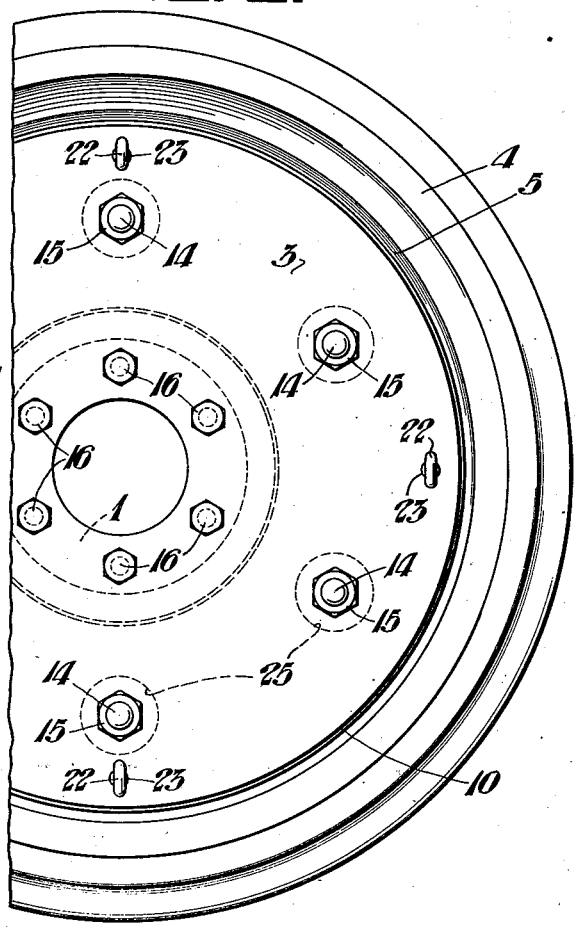

These and other objects will be apparent to those skilled in the art when considered in conjunction with the following drawing, in which:

Figure 1 is a section through a car wheel embodying the present invention, and Figure 2 is a partial side elevation thereof as viewed from the left.

Referring in detail to the drawing, Figure 1 illustrates a section through a wheel in which the hub 1 is bored for a press fit onto an axle and is designed to turn therewith. The hub 1 carries two transversely spaced disks 2 and 3, the disk 2 engaging a shoulder on the hub as shown and being made integral with the hub by the welded joints 2ª shown or by being cast or forged integral with the same. The disk 3 is a separate member secured to the end face of the hub opposite the shouldered portion. Both disks are provided with axially aligned spaced holes through which the shanks of the separator bolts 12 pass to hold the assembly in rigid compressed condition. The bolts as shown are threaded at their right extremities and are screwed into the disks 2. As illustrated at the right hand side of Figure 1, the right extremity of each bolt 12 is screwed into a tapped hole in the disk 2. The axial hole at the center of the disk 3 is smaller than the central hole in the disk 2 so as to match the size of the central bore of the hub. The inner face of the disk 3 abuts the left face of the hub, and a series of tap bolts 16 firmly secure the disk 3 to the hub.

The wheel has a rim 4 formed with an integral rim web 5, which has a center hole 24, the web being disposed between and spaced from the disks 2 and 3.

Between the rim web 5 and the disks 2 and 3 are located annular resilient members 6 which are each composed of a core of resilient material 9 and outer and inner face plates 7 and 8 respectively, both of which are securely bonded to the resilient core 9. The face plates 7 have their outer peripheries formed with outturned flanges 10 which are so dimensioned as to closely contact the outer peripheries of the disks 2 and 3. The inner face plates 8 have their inner peripheries formed with face plate flanges 11 which are so dimensioned as to closely contact the edges of the center hole 24 in the rim web 5.

The face plate flanges 10 and 11 serve to aid in centering the resilient members 6 with reference to the disks 2 and 3, as well as with the web 5, thereby ultimately positioning the face of the rim 4 concentric with the hub bore. In addition, face plate flanges 10 and 11 aid in resisting radial movement of the resilient members 6 with reference to the disks 2 and 3 and the rim web 5.

The coaxially opposite resilient members 6 are provided with a plurality of oppositely spaced holes in their outer face plates 7 which closely contact the shanks 14 of the separator bolts 12 in order to resist torsional movement of the disks 2 and 3 with reference to resilient members 6.

The rim web 5 is provided with a series of holes 25 whose centers coincide with holes 26 in outer face plates 7 and holes 27 and 27ᵃ in the disks 2 and 3 through which the extremities of the bolts 12 extend.

The separator bolts 12 are provided adjacent each end with integral collars 13 which contact the inner faces of the outer face plates 7, so that when pressure from the shoulder bolt nuts 15 is applied, the outer face plates 7 will be tightly pinched between the collars 13 and the disks 2 and 3, thereby minimizing any chance for movement between resilient members 6 and the disks 2 and 3. The shoulder bolts 12 also, by the accurately spaced collars 13, insure uniform pressure on the resilient members 6 when the wheel is properly assembled.

As clearly indicated in the drawing, an annular disk of suitable non-metallic friction material 20 is located on each side of the rim web 5, and between it and the inner face of each of the respective plates 8. The function of the friction material 20 is dual in that it eliminates, when coupled with proper assembly pressure, torsional movement between the rim web 5 and resilient members 6, and also minimizes the transfer of heat generated by braking on the rim 4, from the rim web 5 to resilient members 6. The latter claim is based on the fact that most efficient friction materials, of non-metallic composition, have certain heat insulating values. However, in order to insure proper rotatable assembly, it is advantageous to provide a plurality of accurately located assembly holes 23 which extend through all members of the assembly from side to side, into which aligning pins 22 may be inserted with close fit when the wheel is assembled. These pins may also be employed for the purpose of holding the wheel parts in accurate alignment when it becomes necessary to true up the rim by machining or grinding without the necessity of dismantling the same.

When the wheel is used in street car service or in other railway service wherein current is conducted through the rails over which the wheel travels, suitable flexible electric connections will be provided for properly conveying current through the rim 4 via the web 5 to the hub 1, which is assembled in electrically conducting relation with the usual car axle. From the foregoing it is apparent that our invention provides detail features of wheel construction. Inherent advantages of the construction are that the parts can be easily and quickly fabricated. Most of the metallic parts, such as the outer disk-like plates, as well as the face plates for the resilient members, are formed of flat plate stock which can be easily and quickly stamped out, the flanges of certain of which can be readily formed in conventional types of forming presses utilizing suitable dies. Thus the assemblage can be economically produced without sacrificing strength characteristics and, at the same time, provide the improved characteristic features hereinabove set forth.

We claim:

1. A wheel comprising a rim with an inwardly extending web having an axial opening therein, a hub extending freely through said opening and having a shoulder near one end, a disk abutting said shoulder and secured to the hub by a weld seam, a second disk abutting the hub face opposite said shoulder, means for securing said second disk in abutting relation to said hub face, respective annular resilient units disposed between each of said disks and said web, each of said units comprising inner and outer annular face plates between which are disposed non-metallic cushions of resilient material, each outer face plate having an outturned flange overlapping the outer peripheral edge of the disk adjacent thereto and each inner face plate having an inturned flange overlapping and snugly engaging the wall of the central axial opening of the web, the web and the inner face plates being provided with enlarged holes, bolts extending freely therethrough, the outer portions thereof making a snug fit with openings formed in the outer face plates and the outer disks, each of said bolts having respective shoulders for engagement with the respective outer face plates, and means carried by said bolts securing the resilient units in compressive relation with the outer disks and the central web, there being interposed between each inner face plate and the adjacent face of said web a layer of friction material.

2. A wheel comprising an outer rim with an inwardly extending web having an axial opening therein, a hub extending freely through said opening and carrying spaced risks positioned on opposite sides of said web, respective annular resilient units disposed between each of said disks and said web, each of said units comprising inner and outer face plates between which are disposed non-metallic cushions of resilient material, each outer face plate having an outturned flange overlapping the outer periphery of the disk adjacent thereto and each inner face plate having an inturned flange overlapping and snugly engaging the wall of the central opening of the web, the web and the inner face plates being provided with a series of enlarged holes, bolts extending freely therethrough, the outer portions of said bolts making a snug fit with the openings formed in said outer plates and disks, each of said bolts having respective shoulders engaging the respective outer face plates, means carried by said bolts securing the resilient units in compressive relation with the outer disks and the central web, and a respective layer of friction material interposed between each inner face plate and the adjacent face of said web.

CARROLL BURTON.
DOUGLAS P. STEWARD.